US012575479B2

(12) United States Patent (10) Patent No.: US 12,575,479 B2
Wheeler et al. (45) Date of Patent: Mar. 17, 2026

(54) VEHICLE MOUNTED SPREADER

(71) Applicant: AOB Products Company, Columbia, MO (US)

(72) Inventors: Seth Wheeler, Columbia, MO (US); Ryan Varnum, Columbia, MO (US); Timothy S. Kinney, Warrenton, MO (US); James Tanyon, Moberly, MO (US); Aaron Wood, Columbia, MO (US)

(73) Assignee: AOB Products Company, Columbia, MO (US)

( * ) Notice: Subject to any disclaimer, the term of this patent is extended or adjusted under 35 U.S.C. 154(b) by 426 days.

(21) Appl. No.: 18/052,530

(22) Filed: Nov. 3, 2022

(65) Prior Publication Data

US 2023/0133631 A1 May 4, 2023

Related U.S. Application Data

(60) Provisional application No. 63/263,455, filed on Nov. 3, 2021.

(51) Int. Cl.
*A01C 7/08* (2006.01)
*A01C 7/10* (2006.01)
*E01H 10/00* (2006.01)
*F16K 3/08* (2006.01)
*F16K 37/00* (2006.01)

(52) U.S. Cl.
CPC .............. *A01C 7/085* (2013.01); *A01C 7/102* (2013.01); *E01H 10/007* (2013.01); *F16K 3/085* (2013.01); *F16K 37/0008* (2013.01)

(58) Field of Classification Search
CPC ........... A01C 7/08; A01C 7/085; A01C 7/102; A01C 15/005; A01C 15/006; A01C 17/001; A01C 17/006; E01H 10/007; F16K 3/085; F16K 37/0008
See application file for complete search history.

(56) References Cited

U.S. PATENT DOCUMENTS

| | | | |
|---|---|---|---|
| 2,565,427 | A | 8/1951 | Herd |
| 3,171,658 | A | 3/1965 | Clark |
| 3,227,461 | A | 1/1966 | Love, Jr. |
| 3,586,246 | A | 6/1971 | Van De Lely et al. |
| 3,819,120 | A | 6/1974 | Walker |
| 4,030,641 | A | 6/1977 | Bailey et al. |
| 4,167,248 | A | 9/1979 | Akazawa et al. |
| 4,588,133 | A * | 5/1986 | Brabb .................. A01C 17/006 239/665 |

(Continued)

OTHER PUBLICATIONS

Quantem Corp. Product Bulletin and Corresponding Technical Data Sheet for Series 50 Variable Speed Controller/Modulator; 2 pages (Year: 1988).*

(Continued)

*Primary Examiner* — Darren W Gorman
(74) *Attorney, Agent, or Firm* — Stinson LLP

(57) ABSTRACT

A vehicle mounted spreader and components thereof. The material spreader includes a mount and a spreader assembly. The mount is mountable to a vehicle such as an ATV, UTV, truck, and/or the like. The spreader assembly is mountable to the mount thereon. A user may change the speed at which material is dispersed from the spreader assembly.

35 Claims, 19 Drawing Sheets

(56) References Cited

U.S. PATENT DOCUMENTS

| | | | |
|---|---|---|---|
| 4,785,976 | A | 11/1988 | Bennie et al. |
| 5,669,328 | A | 9/1997 | Lanfranchi |
| 6,533,198 | B1 | 3/2003 | Podevels et al. |
| 6,578,517 | B2 | 6/2003 | Borries et al. |
| 6,637,678 | B2 | 10/2003 | Wyne |
| 6,702,208 | B1 | 3/2004 | Hadler et al. |
| 6,907,832 | B2 | 6/2005 | Wyne |
| 7,063,280 | B1 | 6/2006 | Bogart et al. |
| 7,114,638 | B2 | 10/2006 | Vaynshteyn et al. |
| 7,431,227 | B2 | 10/2008 | Gamble, II et al. |
| 7,607,595 | B2 | 10/2009 | Farmer |
| 7,753,293 | B2 | 7/2010 | Farmer |
| 7,766,257 | B2 | 8/2010 | Gamble et al. |
| 8,016,169 | B2 | 9/2011 | Blandini et al. |
| 8,632,018 | B2 | 1/2014 | Kline et al. |
| 10,088,059 | B2 | 10/2018 | Dubiel et al. |
| 10,271,537 | B2 | 4/2019 | Papke |
| 10,543,496 | B2 | 1/2020 | Vogt |
| 10,736,263 | B2 | 8/2020 | Horeth et al. |
| 2007/0194155 | A1 | 8/2007 | Kendal et al. |
| 2015/0181801 | A1 | 7/2015 | Niemela |
| 2022/0078968 | A1 | 3/2022 | Wood et al. |
| 2022/0279708 | A1* | 9/2022 | Dillon ................. A01C 17/005 |
| 2022/0314862 | A1 | 10/2022 | Moore et al. |

OTHER PUBLICATIONS

Worksaver, Inc. Model No. ATVK-400 Broadcast Seeder-Spreader Owner's/Operator's Manual; 12 pages (Year: 2007).*

Farm Star Equipment "ATV Seeder/Spreader," 1999, Information Sheet, 1 page.

Farm Star Equipment, ATVK-400 Seeder Mounting Kit, 1999, Information Sheet, 1 page.

Farm Star Equipment, "ATVK-400 Broadcast Seeder/Spreader," 1999, Information Sheet, 1 page.

* cited by examiner

VEHICLE MOUNTED SPREADER

CROSS-REFERENCE TO RELATED APPLICATION

The present application claims priority to U.S. Provisional Patent App. No. 63/263,455 filed Nov. 3, 2021, which is hereby incorporated by reference in its entirety.

FIELD

The present disclosure generally relates to material spreaders, and more particularly to material spreaders for mounting to a vehicle.

BACKGROUND

Material spreaders which mount to a vehicle are generally known; however, improvements are needed.

SUMMARY

In one aspect, a material spreader usable with a user-operated All-Terrain Vehicle (ATV) or Utility-Terrain Vehicle (UTV) to spread material comprises a mount configured to mount to the ATV or UTV and a spreader assembly. The spreader assembly comprises a base and a hopper supported by the base. The hopper includes an interior configured to hold a supply of the material. The hopper has an inlet opening through which material can be delivered to the interior and an outlet opening through which material can exit the interior. The spreader assembly includes a thrower supported by the base and configured to spread the material from the hopper onto a surface over which the ATV or UTV moves. A control system includes a power source and a motor operatively connected to the thrower. A flow rate assembly is configured to control a flow rate at which the material flows to the thrower. The flow rate assembly includes gate passage structure configured to permit material to flow therethrough. The flow rate assembly includes a flow adjustor moveable with respect to the gate passage structure to change a degree of openness of the gate passage structure. A gate is moveable with respect to the gate passage structure and the flow adjustor. The gate is moveable between a closed position and an open position. The gate when in the closed position prevents flow of material from the hopper to the thrower. The gate in the open position permits flow of material from the hopper to the thrower through the gate passage structure.

In another aspect, a material spreader usable with a user operated All-Terrain Vehicle (ATV) for spreading material comprises a mount configured to mount to the ATV and a spreader assembly. The spreader assembly comprises a base and a hopper. The hopper is supported by the base and configured to hold a supply of the material. A thrower is supported by the base and configured to spread the material from the hopper to a surface over which the ATV moves. A flow rate assembly is configured to control a rate of flow at which the material flows to the thrower. A control system includes a power source and a motor operatively connected to the thrower. A user interface is operatively connected to the control system and includes at least one actuator configured to permit the user to adjust a speed of the motor and turn the motor on and off.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
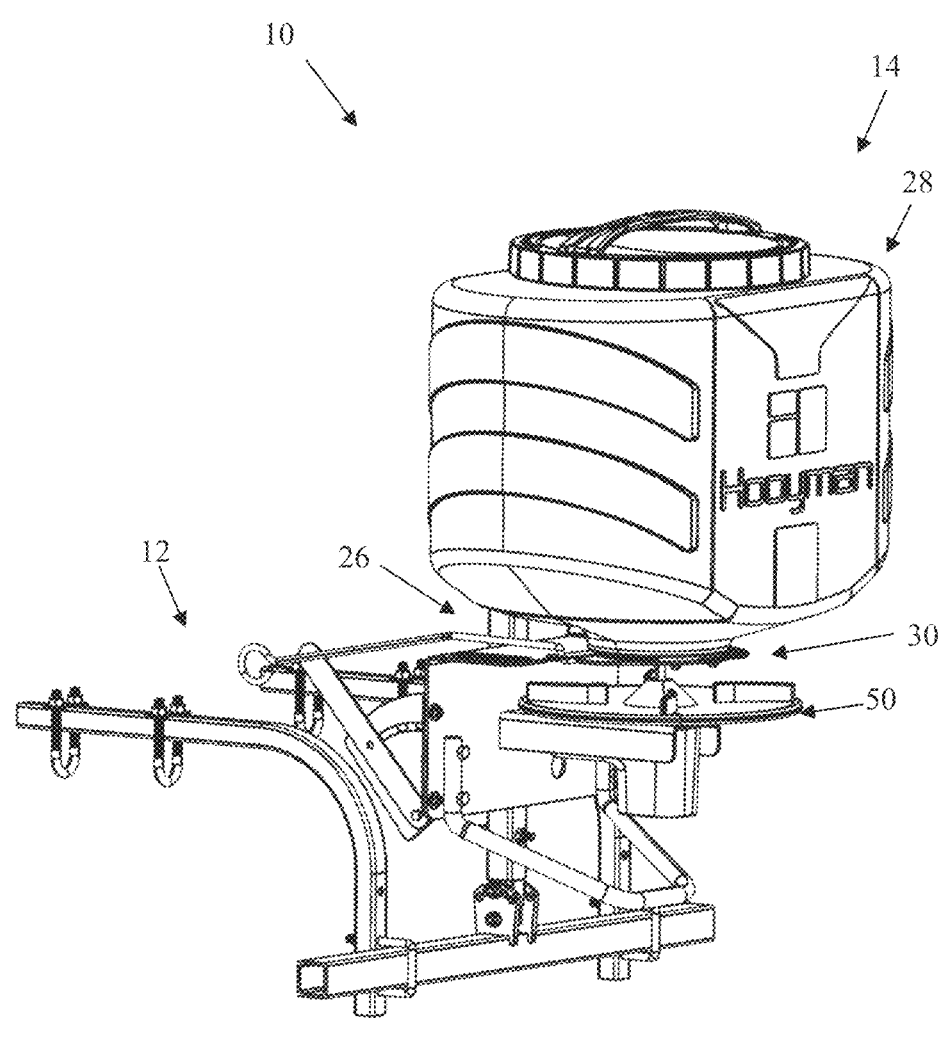
FIG. 1 is a front perspective of a spreader including a mount and a spreader assembly, the spreader assembly having a flow rate assembly.
Figure 2:
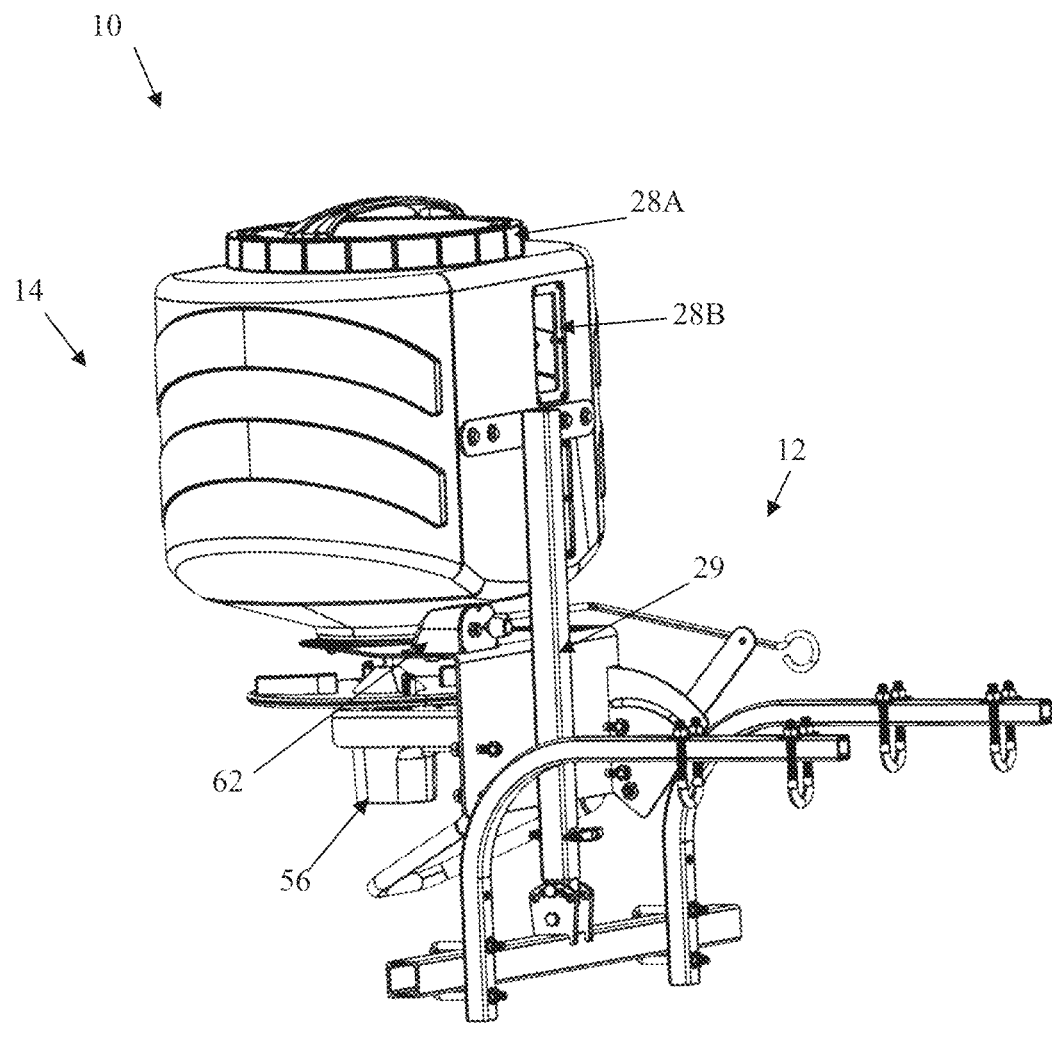
FIG. 2 is a rear perspective of FIG. 1.

Referring to FIGS. 1 and 2, a material spreader (broadly, "spreader") of the present disclosure is indicated by 10. In the illustrated embodiment, the spreader is configured to be secured to a vehicle to assist a user/operator in spreading material (e.g. seed, salt, fertilizer, other pelletized material, etc.) over a surface in which the vehicle is driven. The spreader can be mounted to vehicles such as an all-terrain vehicle (ATV) (also commonly referred to as a "four wheeler"); utility-terrain vehicle (UTV) (also commonly referred to as a "side-by-side"); truck; etc. Materials which the spreader can spread can vary in use and size. For example, corn, clover, soybeans, sunflowers, grass seed, salt, fertilizer, herbicide, etc. can be spread from the spreader onto surfaces such as a field, pavement, etc.

In general, the spreader 10 comprises a mount 12 and a spreader assembly 14. The mount 12 is configured to be connected to mounting structure of the vehicle. For example, the mount 12 can be connected to a trailer hitch of the vehicle having a trailer hitch, or to a vehicle having compatible mounting structure. For example, a first embodiment of the mount can be mounted to a vehicle such as an ATV having a front or rear rack. A second embodiment of the mount is configured to be mounted to a trailer hitch of a truck and/or a UTV. The spreader assembly is configured to be mountable to the mount. The user can remove the spreader assembly from the mount for transporting, storage, etc., while the mount remains connected to the vehicle mounting structure.

Figure 3:
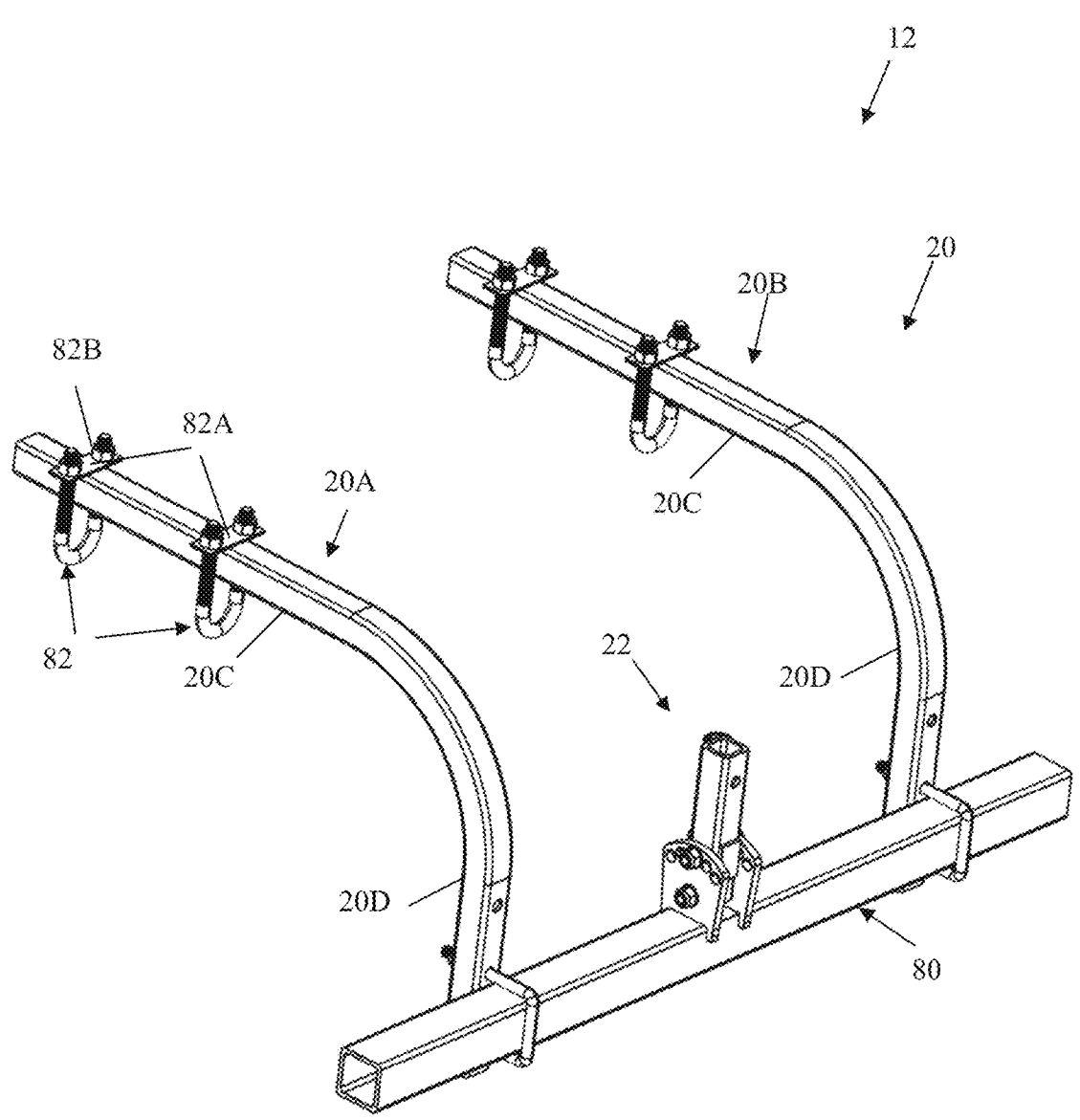
FIG. 3 is a perspective of a mount of a first embodiment.
Figure 4:
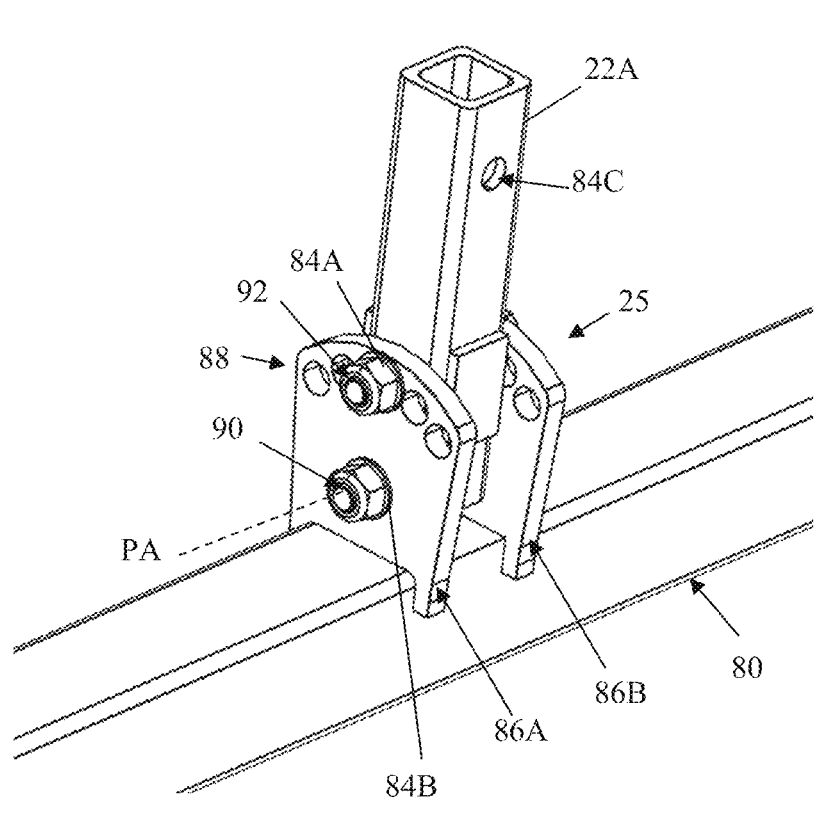
FIG. 4 is a fragmentary perspective of the mount including a connector.

Referring to FIGS. 3 and 4, the mount 12 of the first embodiment comprises a frame 20 and a support receiver 22 (broadly, "connector"). The frame 20 includes first and second arms 20A, 20B, a crossbar 80, and fasteners 82. Each mounting arm 20A, 20B has a first portion 20C and a second portion 20D where an elbow is formed between the first and second portions to form a generally L-shaped arm. Fasteners 82 (e.g. U-bolts) can pass through a plate 82A, secured by nuts 82B, to secure the first portions of the respective arms to the mounting structure of the vehicle, for example a rack of an ATV. In the illustrated embodiment of FIG. 4, the support receiver 22 comprises a support receiver body 22A which defines two through-holes 84A, 84B (upper and lower). The connector body defines a through hole 84C, transverse to holes 84A, 84B.

The support receiver 22 is configured to include an adjustment assembly 25. The adjustment assembly 25 comprises a pair of holders 86A, 86B. Each holder is secured (e.g. welded) to the crossbar 80. Each holder defines a first through hole 84B and plurality of through-holes 88 arranged in an arcuate series. A carriage pin 90 (broadly, "fastener") is received through the through holes 84A of each respective holder 86A, 86B and defines a pivot axis PA about which the support receiver 22 can pivot. The support receiver 22 can be pivoted to a position as seen fit by the user, generally an upright position with respect to the first portions of the arms, or otherwise to orient the spreader assembly generally vertical with respect to the ground. It will be appreciated that mounting racks on various ATVs may not be parallel to the ground, and the vertical adjustment can be useful to properly orient the spreader assembly. An adjustment pin 92 (broadly, "fastener") can be passed through a selected hole from the series of holes 88 and passed through the upper hole 84A of the support receiver to hold the support receiver in place. Shims can be used to fill gaps between the U-bolts to provide a rattle-free connection. Such shims can also be used for leveling the mount on the vehicle. Moreover, metal D-loops (broadly, "connectors") can be installed on either the frame or the support of the spreader, to which ratchet straps or other ties can connect to further provide a rattle-free connection.

Other types of mounts can be used without departing from the scope of the present disclosure. For example, in another embodiment, the support receiver 22 can be secured (e.g. welded) to the crossbar 180 such that it is not provide vertical adjustment.

Referring to FIGS. 1 and 2, the spreader assembly 14 comprises a base 26, a hopper 28 supported by the base 26, a flow rate assembly 30 arranged at the bottom of the hopper 28, and a thrower 50 arranged below the flow rate assembly. The thrower 50 is operable by a user interface. The thrower is rotated by an output shaft operatively connected to a motor 56 and controlled by the user interface. The user interface includes a user input which comprises first and second actuators, 60A, 60B, (broadly, "actuators"). In the illustrated embodiment of FIG. 16, the actuators 60A, 60B are housed in a housing 62 supported by the base 26. The first actuator 60A includes an On/Off switch. The second actuator 60B includes a motor speed adjustor. The On/Off switch is a pressable button which the user can press to turn the motor on and off. The motor speed adjustor includes an adjustable toggle dial switch which the user can turn to increase or decrease the speed in which the motor rotates the output shaft, which in turn spins or rotates the thrower. In the illustrated embodiment, the adjustor works in conjunction with a variable resistor, such as a Rheostat resistor. The housing 62 is fastened to the base 26 and houses other electrical components of the user interface, such as wiring. A waterproof sealant can be installed around the actuator/housing interface and/or the housing to prevent water or moisture intrusion. A gasket may be provided thereover to further prevent moisture from entering that region. Different types of actuators (e.g. dials, buttons, sliders, etc.) can be used without departing from the scope of this disclosure.

Figure 5:
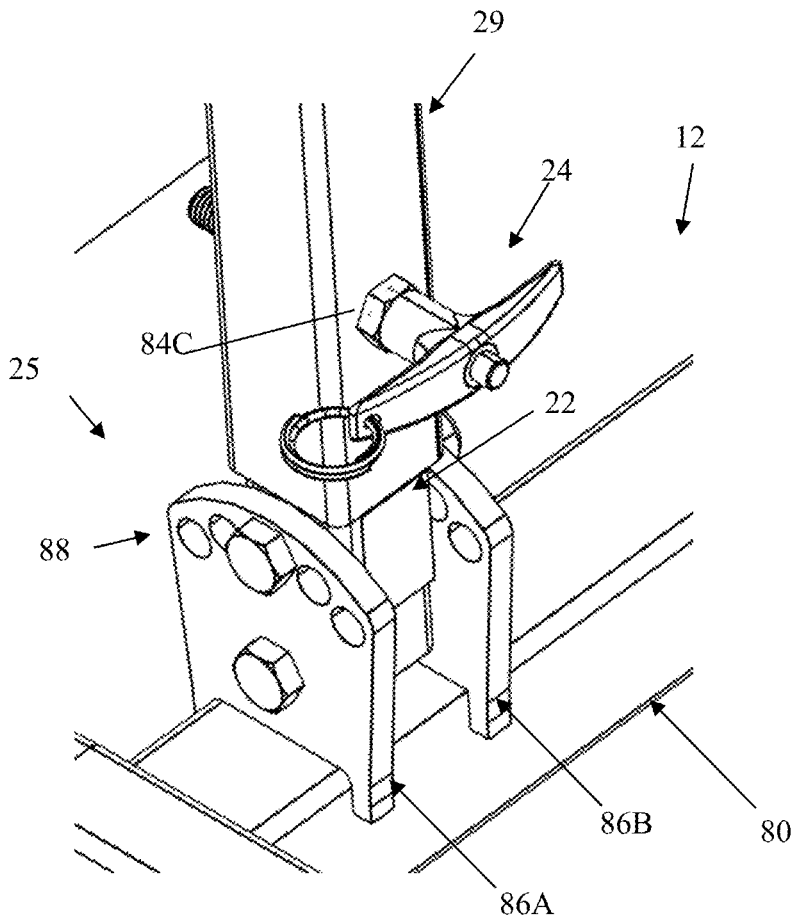
FIG. 5 is an enlarged fragmentary perspective including a connection of the spreader assembly to the mount.
Figure 16:
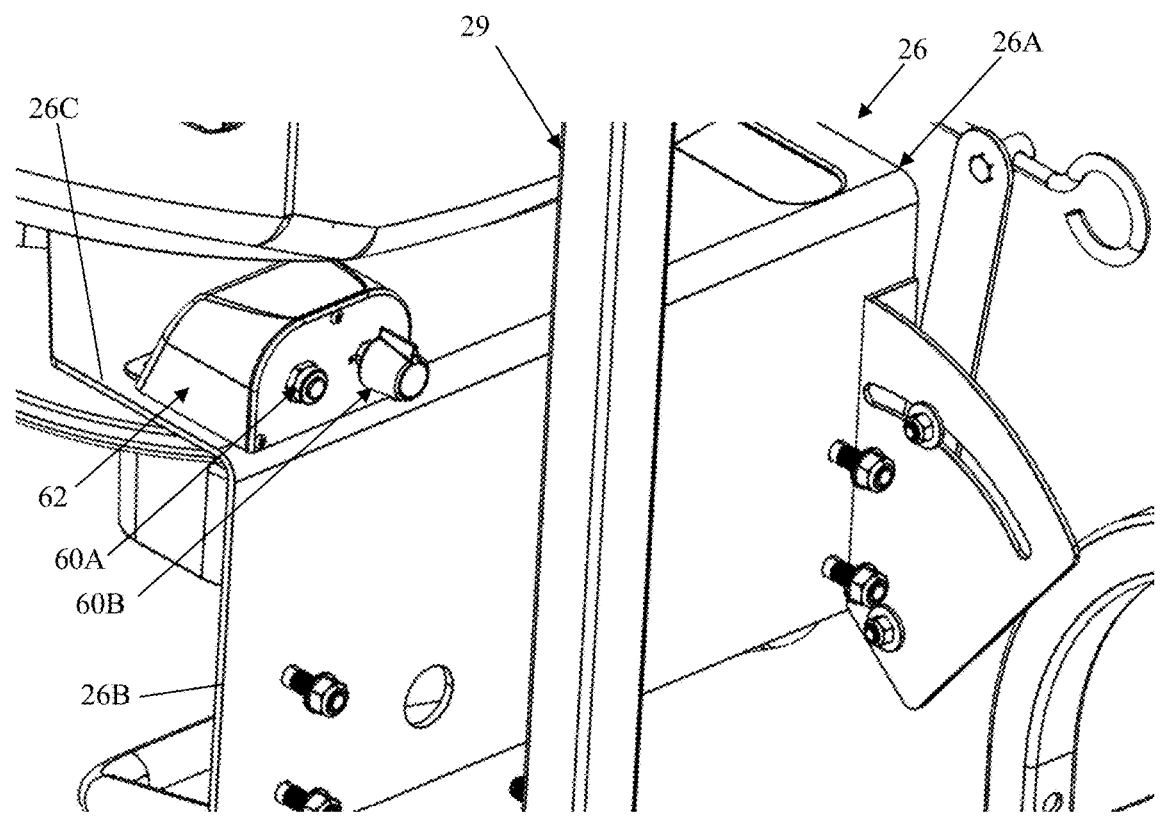
FIG. 16 is an enlarged fragmentary perspective showing a control interface.

Referring to FIG. 16, the base 26 of the spreader assembly comprises a bracket 26A and a support 29 (broadly, "connector"). The bracket 26A includes first and second portions 26B, 26C each configured to support various components of the spreader assembly. The first portion 26B is arranged in an upstanding fashion and the second portion 26C extends rearward from the first portion to form an L-shape. The connector 29 of the spreader assembly is configured to connect to the connector 22 of the mount 12. In the illustrated embodiment of FIGS. 2 and 5, the connector 29 of the spreader assembly 14 includes a rectangular post which is secured to the first portion of the bracket in a generally upstanding fashion. The rectangular post of the spreader assembly is slightly larger than the rectangular post of the frame to form a male/female or mating connection. The connectors define through-holes which align each other to allow a fastener 24 to pass through for securing the connection. Other configurations can be used without departing from the scope of the present disclosure.

Figure 6:
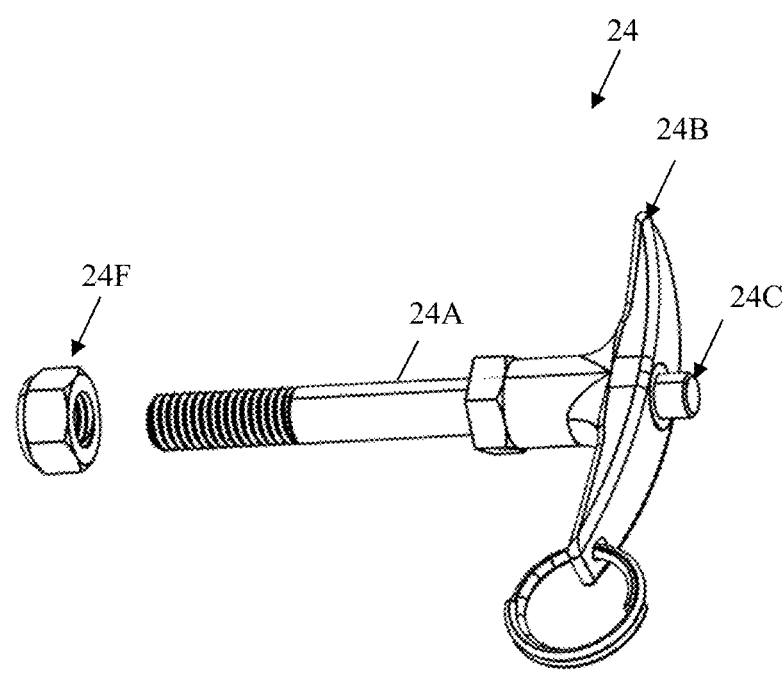
FIG. 6 is a perspective of a fastener usable to form the connection.

Referring to FIG. 6, the fastener 24 can be a pin which passes through the opening 84C and is removable by the user. The pin comprises a pin body 24A and a handle 24B. The pin body can be passed through the opening 8C and secured using a nut 24F. In other embodiments, a detent mechanism may be used. A button 24C (broadly, "actuator") can be arranged to move the detent (not shown). For example, the detent would arranged at one end of the pin body and the handle and actuator are arranged at the opposite end. The handle includes a T-shaped head in which the button protrudes. In response to the user pressing the button, the detent retracts into the pin body permitting the pin to be removable through the openings. Other ways of securing the connectors to form a connection are not outside the scope of this disclosure. A connector (e.g. ring) may be provided on the handle to secure to a tether for safekeeping.

The hopper 28 defines an interior sized and shaped for holding the material. A top side of the hopper defines an inlet opening in which the user can pour the material to the interior. An outlet opening is arranged on a side opposite the inlet opening. The flow rate assembly covers the outlet opening, as will be described in greater detail below. A bottom portion of the hopper includes a neck which is angled toward the outlet opening to further facilitate flow of the material downward toward the outlet. A lid 28A may be provided to cover the inlet opening of the hopper to prevent material from escaping the hopper and/or debris from entering the hopper. A side of the hopper (e.g. the side which faces the operator in the driver seat) includes a viewing window 28B through which the operator can look to see how much material remains in the hopper. The outlet opening of the hopper is generally a circular shape, however other opening shapes can be used without departing from the scope of this disclosure.

In the illustrated embodiment, the hopper 28 is supported and connected to the second portion 26C of the bracket. A support member (e.g. a bracket arranged horizontally relative to the hopper) spans across the back side of the hopper and is secured to a distal end of the connector to provide additional support to the hopper. The second portion 26C of the bracket 26A defines a handle 26D which can assist the user in lifting the spreader assembly off the mount. The actuator housing of the control system is secured to the second portion of the bracket, which is easily accessible to the user.

The flow rate assembly 30 comprises a flow gate 32 which the user/operator may move between a fully open position (FIG. 9) and a fully closed position (FIG. 8) by actuating a lever and/or handle 34. As will be described in greater detail below, the flow rate assembly 30 can be manipulated by the user to permit a desired amount of material to expel from the hopper 28 and onto the thrower 50, which is ultimately spread over the surface over which the vehicle is moving.

Figure 7:
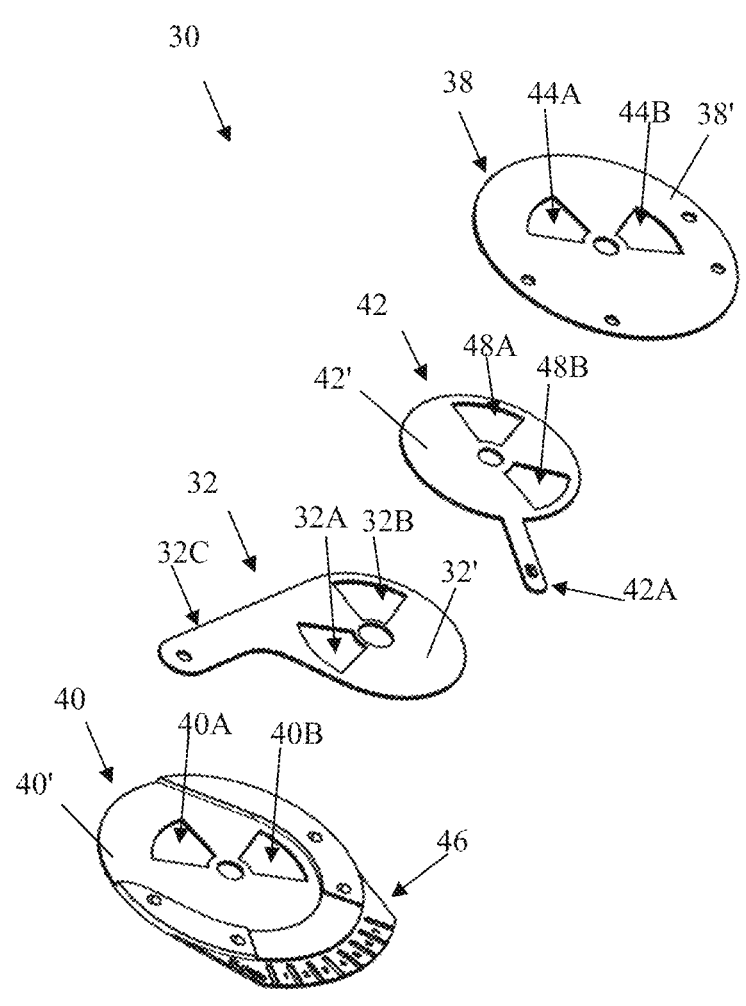
FIG. 7 is an enlarged fragmentary exploded perspective of components of the flow rate assembly.

Referring to FIG. 7, the flow rate assembly 30 comprises an upper housing portion 38; a lower housing portion 40, a flow rate restrictor plate 42; and the flow gate 32. The upper and lower housing portions 38, 40 can be referred to broadly as gate passage structure. As will become apparent, the flow rate restrictor plate 42 and gate 32 are configured to change a degree of openness of the gate passage structure to control a flow rate of material to the thrower. The gate passage structure includes an upper gate passage structure portion (e.g., a portion of the upper housing portion 38) and a lower gate passage structure portion (e.g., a portion of the lower housing portion 40). Other configurations can be used without departing from the scope of the present disclosure.

The flow rate assembly 30 is connected (e.g. fastened) to the hopper to overlie the outlet opening of the hopper. The upper housing portion 38 faces upward toward the interior of the hopper 28 whereas the lower housing portion 40 faces downward toward the thrower 50. The flow rate assembly 30 is configured to allow the user to adjust the flow restrictor plate 42 to predetermined positions which correspond with a desired rate of flow at which the material will fall from the hopper and onto the thrower. Desirably, the predetermined, or "preset," location of the flow restrictor plate is set prior to operation of the vehicle. The flow restrictor plate is pre-set before the operator is driving the vehicle to spread the material, and while the operator is operating the vehicle, they can move the flow gate between the open and closed positions to start and stop spreading of material. Desirably, the flow gate is opened at least as much as the flow restrictor (e.g., flow gate full open) such that it is the flow restrictor that determines or limits flow through the flow rate assembly.

The upper housing portion 38 (broadly, "fixed member") includes an upper housing portion body 38'. In the illustrated embodiment, the upper housing portion body is generally disc-shaped to correspond with the circular shape of the outlet opening of the hopper. The upper housing portion includes an opening through which the material can pass. In the illustrated embodiment, the upper housing portion body 38' defines two openings 44A, 44B (broadly, "an opening"). In the illustrated embodiment, each opening 44A, 44B has a wedge shape spanning radially outward from a center of the disc, but stopping short of the edge of the disc. In the illustrated embodiment, the angle of the wedge shape is about seventy degrees, but other larger or smaller angles can be used. The wedge shape has a generally truncated pie piece shape. Other shapes can be used without departing from the scope of the present disclosure.

Figure 8:
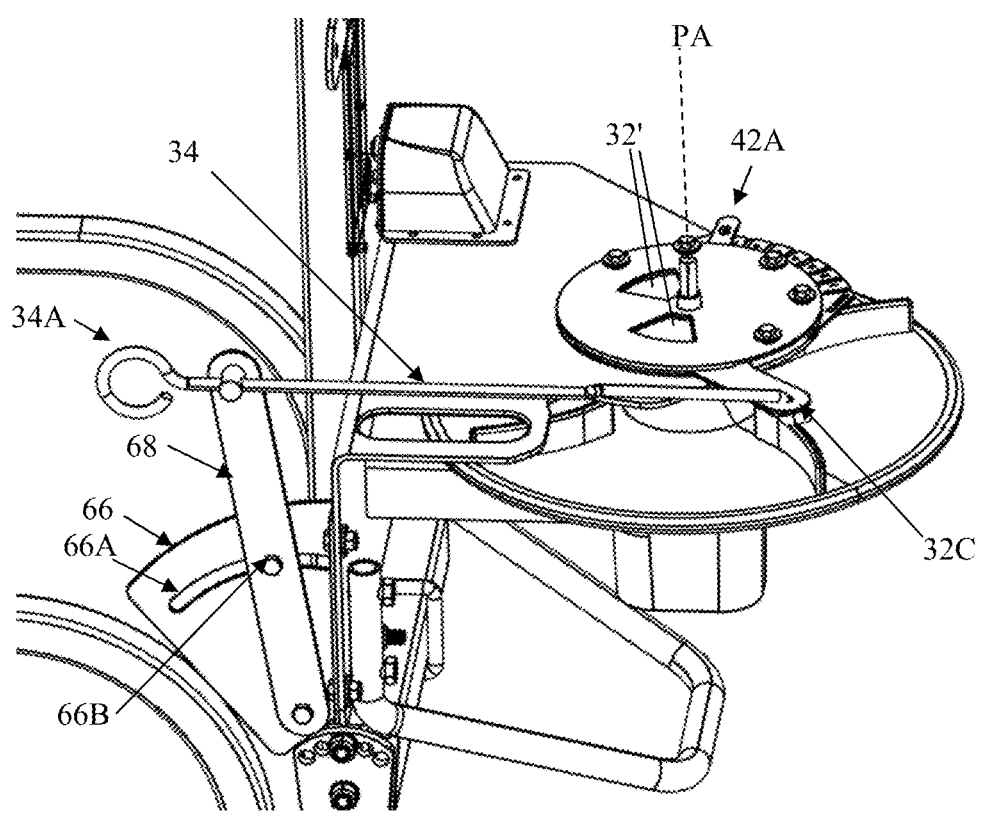
FIG. 8 is a side perspective showing a handle of the flow gate in the closed position.
Figure 9:
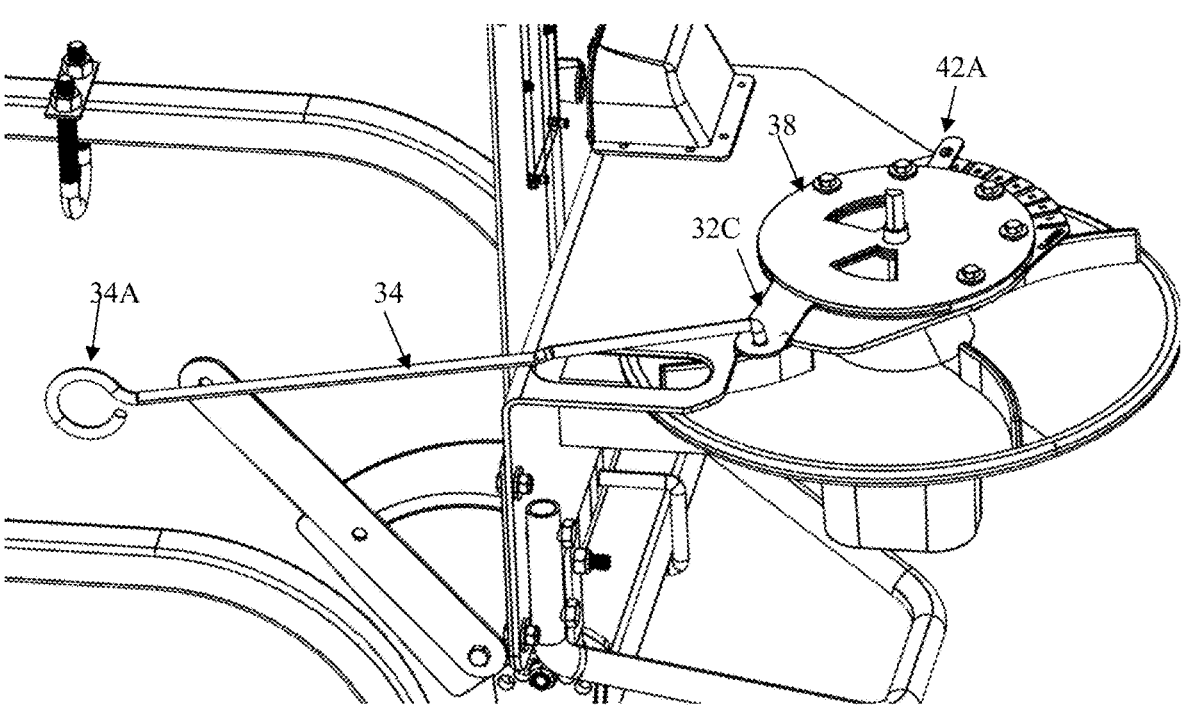
FIG. 9 is a side perspective showing the handle the flow gate in an open position.

An edge portion of the disc defines openings in which bolts 31 (broadly, "fasteners") can be received to secure together the other components of the assembly. A pin passed through the center of the disc defines a pivot axis PA, (FIG. 8). The pin also passes through other moveable components of the assembly. An agitator (broadly, "spindle") protrudes from the upper housing portion into the interior of the hopper. The output shaft can rotate the agitator to facilitate movement of the material within the hopper. The upper housing portion could be shaped differently without departing from the scope of this disclosure.

The lower housing portion 40 comprises a body 40' sized and shaped to correspond with the size and shape of the upper housing portion. In the illustrated embodiment, the body 40' defines openings 40A, 40B. A portion of the main body extends outboard relative to the upper housing portion and defines a lock engagement structure 46 (broadly, "flow restrictor engagement structure"). The lock engagement structure 46 defines predetermined positions each having an associated indicator. A forward side of the lower housing portion includes an arcuate track allowing for the handle 42A of the flow restrictor plate to freely move. Similarly, a rear side of the lower housing portion includes a track allowing for the handle 32C of the feed gate to freely move.

Figure 13:
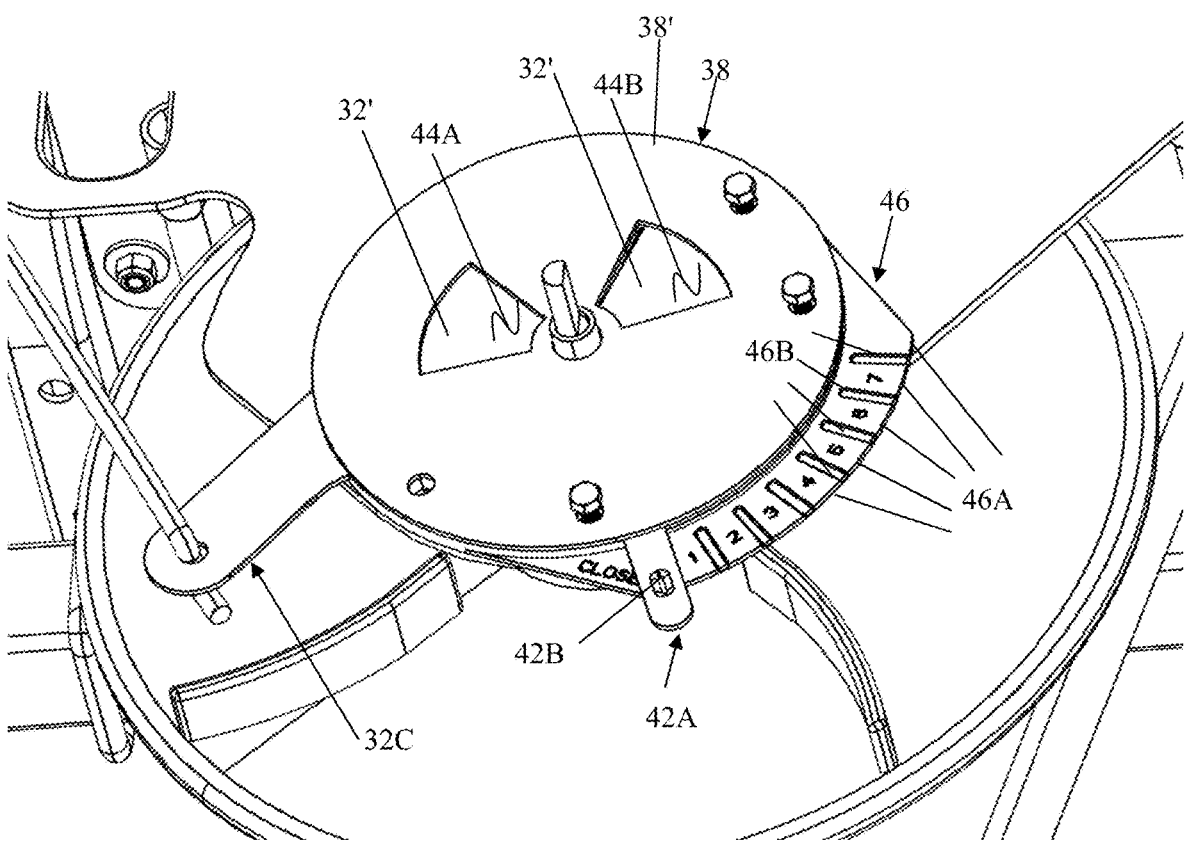
FIG. 13 is a top perspective of the flow rate assembly with the flow adjustor fully closed and the flow gate closed.

As illustrated in FIG. 13, there are nine teeth 46A (broadly, "protrusions") arranged in a series and eight notches 46B (broadly, "retainers") defined by two adjacent teeth 46A. The lock engagement structure comprises indicators including a letter "C," which stands for "closed" and numbers 1-7. The numbers 1-7 correspond to a degree to which the flow adjustor can be set, as will be described below. The indicators, and the lock engagement structure, are arranged to face rearward with respect to the vehicle. This allows a user standing outside the vehicle to face the spreader and view the markings while the spreader is mounted to the vehicle. It is anticipated the operator will refer to these markings while not sitting in an operator station of the vehicle, but other configurations can be used. Other indicators (e.g. colors, graphics, etc.) may be used. An edge portion of the main body defines openings sized, shaped, and arranged to correspond with the openings of the upper housing portion to receive the bolts. Nuts, and washers, are used to fasten together the bolts. More or fewer teeth and/or notches could be included without departing from the scope of this disclosure. Moreover, other arrangements can be used for permitting a user to set a degree of openness of the gate passage structure, such as other arrangements (e.g., ball detent) configured to provide preset open settings.

The flow restrictor plate 42, hereinafter referred to as the flow adjustor, is arranged immediately below the upper housing portion 38 configured to pivot about the pivot axis PA. The flow adjustor 42 includes a flow adjustor body 42' and a handle 42A (broadly, "actuator") protruding from the flow adjustor body. The flow adjustor body can be disc-shaped to correspond with the other components of the assembly. The flow adjustor 42 is configured to be moveable with respect to the upper housing portion. The arrangement is such that the flow adjustor 42 can be moveable to cover (fully, partially, or not at all—broadly, "change the size") the wedge shaped opening(s) 44A, 44B of the upper housing portion 38. In the illustrated embodiment, the flow adjustor 42 defines wedge-shaped openings 48A, 48B which can correspond to the wedge-shaped openings 44A, 44B of the upper housing portion 38. The wedge shaped openings of the flow adjustor could be omitted such that the flow adjustor body 42' is sized and shaped to cover the wedge-shaped openings of the upper housing portion.

As illustrated in FIG. 13, the flow adjustor handle 42A extends from the disc-shaped body in the direction of the lock engagement structure 46 so it is accessible by the user. The flow adjustor handle 42A comprises a keeper 42B which is configured to engage with the notches 46B of the lower housing portion 40.

The flow gate 32 is arranged immediately below the flow adjustor 42. The flow gate 32 includes a flow gate body 32' and an arm 32C (broadly, "lever") extending from the flow gate body. The flow gate 32 can be disc-shaped to correspond with the other components of the assembly. The flow gate is configured to be moveable with respect to the upper housing portion to either cover (i.e. closed position) or uncover (i.e. open position) the opening formed between the openings 44A, 44B of the upper housing 38 and the openings 48A, 48B of the flow adjustor 42. In the illustrated embodiment, the flow gate is configured to pivot about the pivot axis, PA, between the fully open (FIG. 9) and fully closed positions (FIG. 8).

In the illustrated embodiment, the flow gate 32 is disc-shaped to correspond with the other components of the assembly. The flow gate body 32' defines wedge-shaped openings 32A, 32B (broadly, "an opening") which can be in registration with the wedge shaped openings 48A,48B of the flow adjustor 42, and with the openings 44A, 44B the upper housing portion 38. As will become apparent, pivotable movement of the flow gate 32 (between closed and open positions) will cause the flow gate body 32' to cover the openings 48A, 48B of the flow adjustor 42 and the openings 44A, 44B of the upper housing portion 38 (i.e., closed position), or the flow gate openings 32A, 32B will align with the openings of the flow adjustor and upper housing (i.e., open position). The flow gate could be arranged immediately above the flow restrictor plate without departing from the scope of this disclosure. Moreover, other positions can be used (e.g., with intermediate structure between the flow restrictor and flow gate). The wedge-shaped openings of the flow gate could be omitted such that the flow gate body is sized and shaped to fully cover and/or uncover the opening(s) of the upper housing.

The arm 32C of the flow gate 32 is arranged to face generally in the direction of the operator sitting in the driver's seat of the vehicle. The arm 32C includes and opening (broadly, "connector") to connect to a handle 34 (broadly, "actuator") which is reachable by the operator/driver. The arrangement is such that the driver can pull the handle 34 toward themselves (forward) to open the flow gate (FIG. 9), or push the handle away (rearward) to close the flow gate (FIG. 8), as will be described in greater detail below. In the illustrated embodiment, the handle 34 includes a metal rod having a hook (broadly, "connector") arranged at the distal end to connect to the arm 32C. The proximal end of the rod includes a handle head 34A which the operator can grasp to pull or push the handle. In the illustrated embodiment, the handle head has an opening configured to receive the operator's finger.

The handle 34 can be supported by intermediate support structure which can guide the movement of the handle. In the illustrated embodiment, the intervening support structure comprises a flange 66 (broadly, "guide") and a support arm 68. The flange 66 extends forward from the bracket 26A and defines an arcuate track 66A. A proximal end of the support arm 68 is pivotably connected to a base the flange 66. A distal end of the support arm 68 is secured to an intermediate part of the handle 34. A guide pin 66B protrudes from an intermediate portion of the support arm and extends through the track. The guide pin can be loosely fastened using a nut (e.g. a wing-nut) to allow the support arm to move along the track in a guided manner.

In other embodiments, the flow adjustor and the flow gate can be moved between respective preset positions and open and closed positions in ways other than pivoting about the pivot axis PA (e.g., sliding).

Referring to FIGS. 8-15, different settings of the flow rate assembly will be discussed in greater detail. The different settings allow the user to adjust the rate at which material will fall from the hopper onto the thrower.

Figure 12:
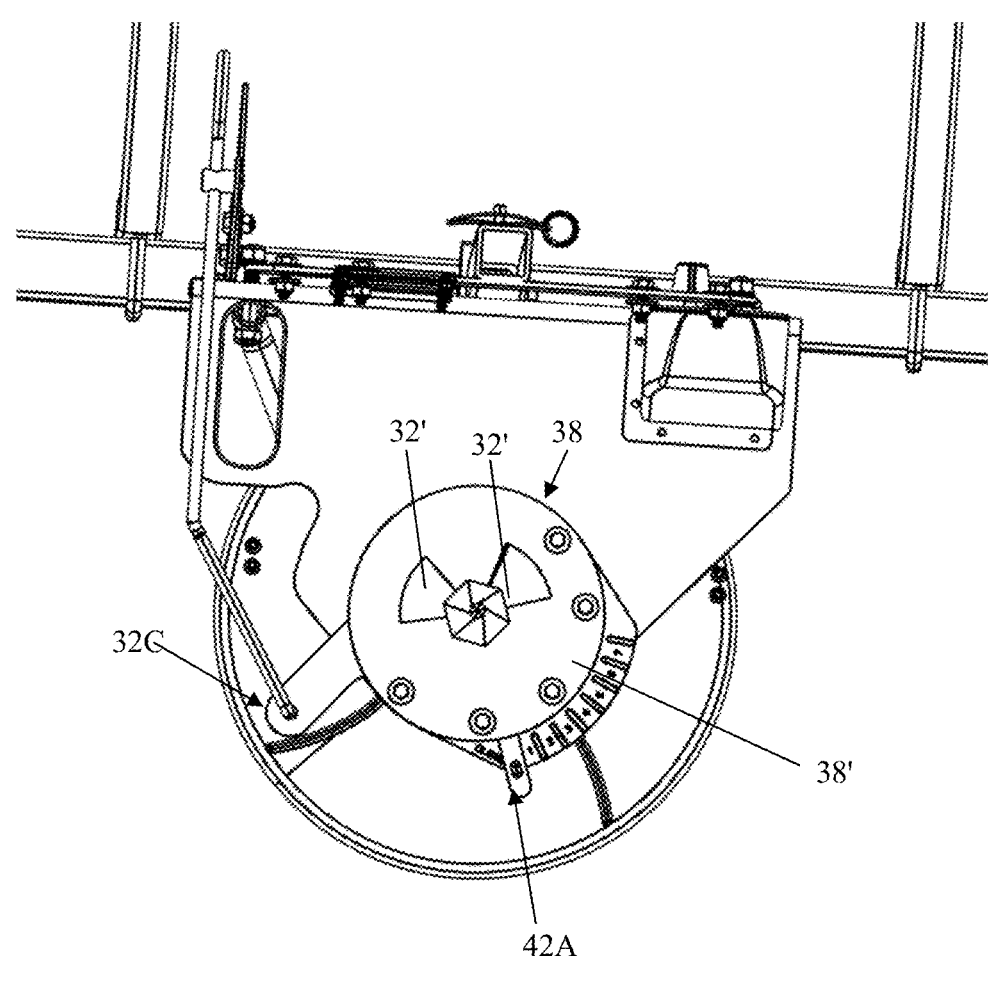
FIG. 12 is a top view of the flow adjustor in a fully closed setting.

FIGS. 12 and 13 illustrate a first configuration (Configuration A) in which the flow adjustor 42 is in the fully closed position and the flow gate 32 is in the fully closed position. The flow adjustor handle 42A is moved to preset position "C" to arrange the flow adjustor 42 to the fully closed position. The openings 48A, 48B of the flow adjustor 42 (covered by upper housing portion) overlie the body 40' of the lower housing portion. The arm 32C of the flow gate 32 is moved to the forward position such that the flow gate body 32' overlies the openings 44A, 44B of the upper housing portion 38. The configuration of Configuration A is such that no material is permitted to pass through the flow rate assembly.

Figure 10:
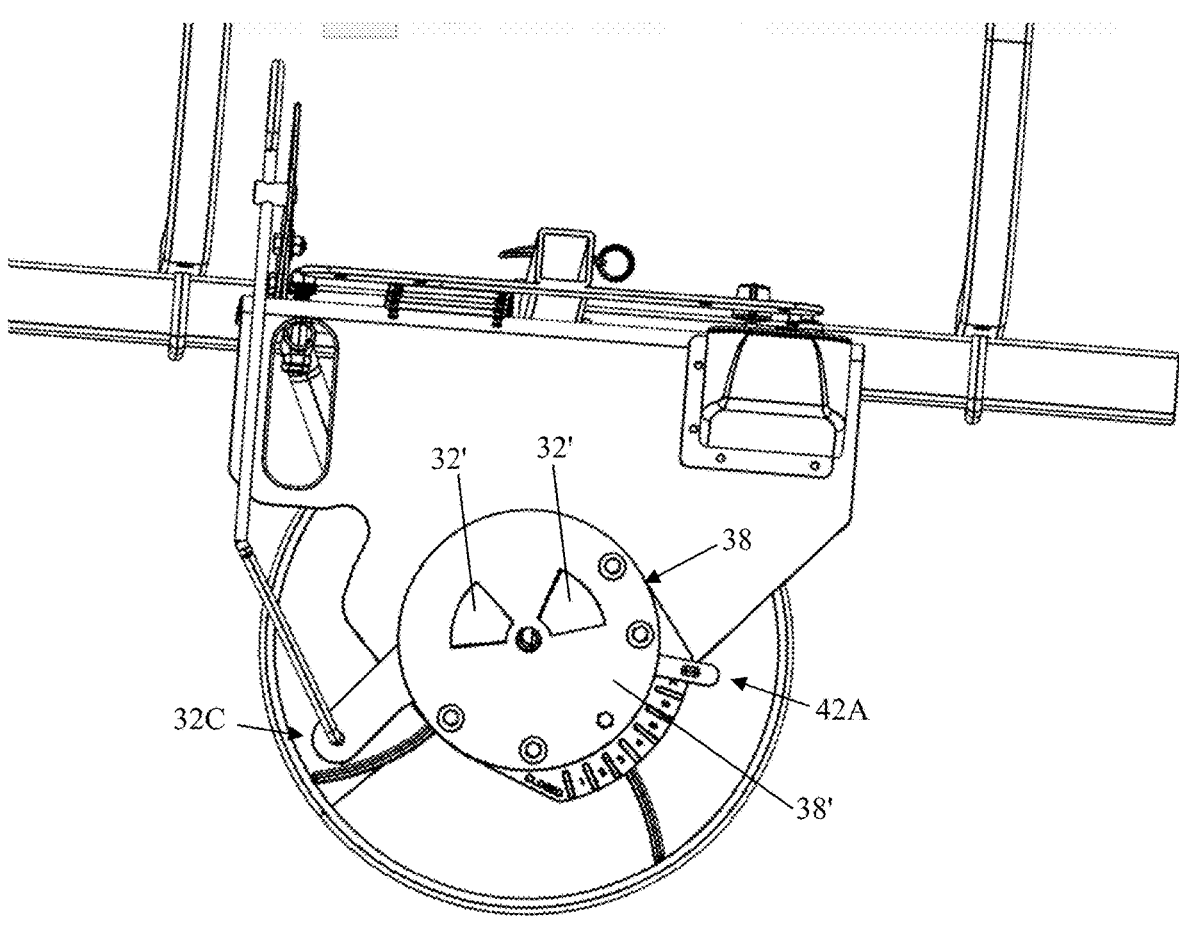
FIG. 10 is a top view of the flow adjustor in a fully open setting.

FIGS. 8 and 10, illustrate a second configuration (Configuration B) in which the flow adjustor 42 is in the fully open position and the flow gate 32 is in the fully closed position. The flow adjustor handle 42A is moved to preset Position 7 to arrange the flow adjustor 42 to the fully open position. The openings 48A, 48B of the flow adjustor 42 align with the openings 44A, 44B of the upper housing portion 38 and the openings 40A, 40B of the lower housing portion 40. However, the arm 32C of the flow gate 32 is moved to the forward position such that the flow gate body 32' overlies the aligned openings 44A, 44B of the upper housing portion 38 and the openings 48A, 48B of the flow adjustor 42. The configuration of Configuration B is such that no material is permitted to pass through the flow assembly.

Figure 14:
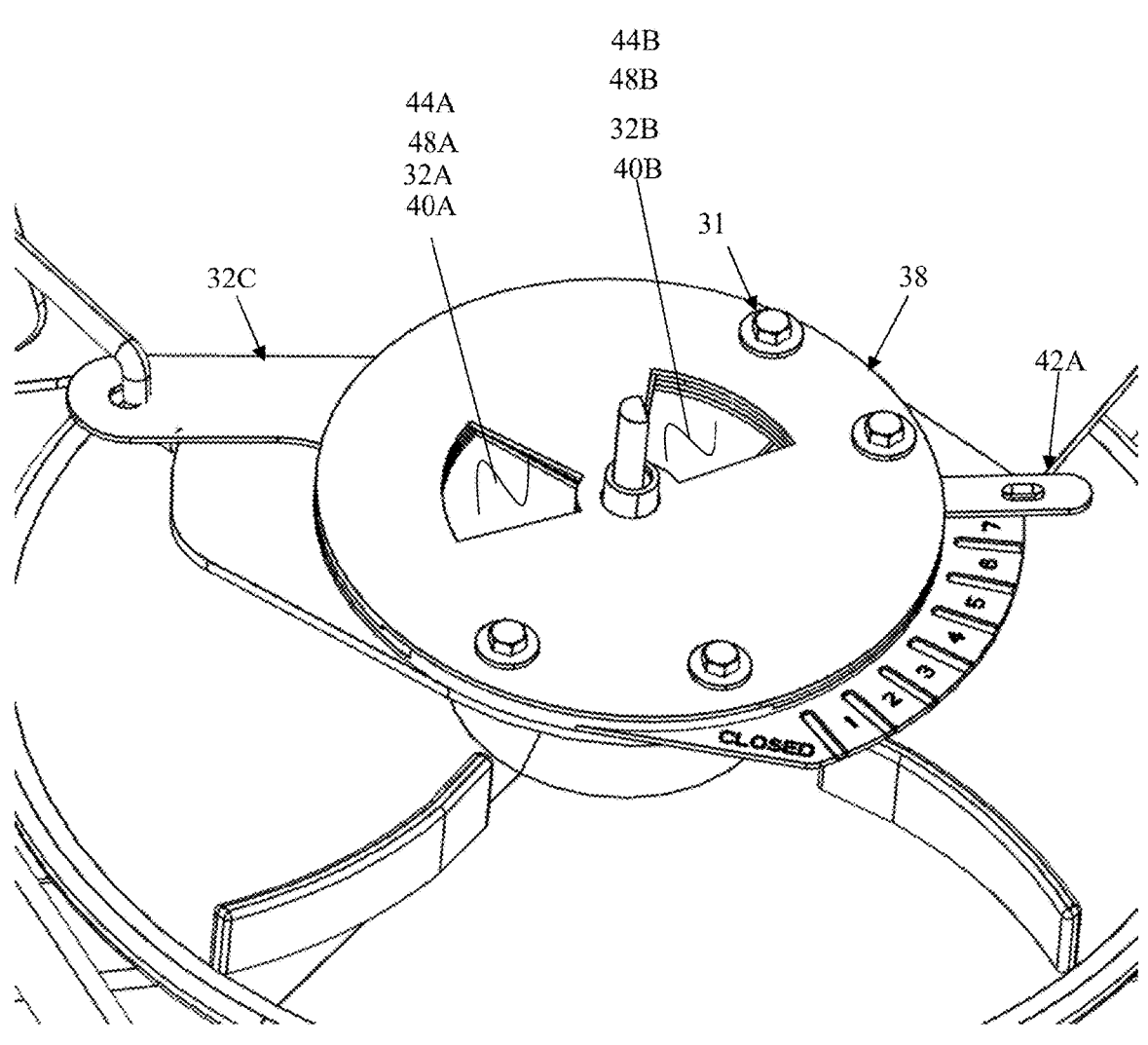
FIG. 14 is a top perspective of the flow rate assembly with the flow adjustor fully open and the flow gate fully open.

FIG. 14 illustrates a third configuration (Configuration C) in which the flow adjustor 42 is in the fully open position and the flow gate 32 is in the fully open position. The flow adjustor handle 42A is moved to preset Position 7 to arrange the flow adjustor 42 to the fully open position. The openings 48A, 48B of the flow adjustor 42 fully align with the openings 44A, 44B of the upper housing portion 38. The arm 32C of the flow gate 32 is moved to the rearward position such that the openings 32A, 32B of the flow gate 32 fully align the openings 32A, 32B of the lower housing portion. All the openings fully align with each other. The configuration of Configuration C is such that a maximum amount of material is permitted to pass through the flow rate assembly.

Figure 11:
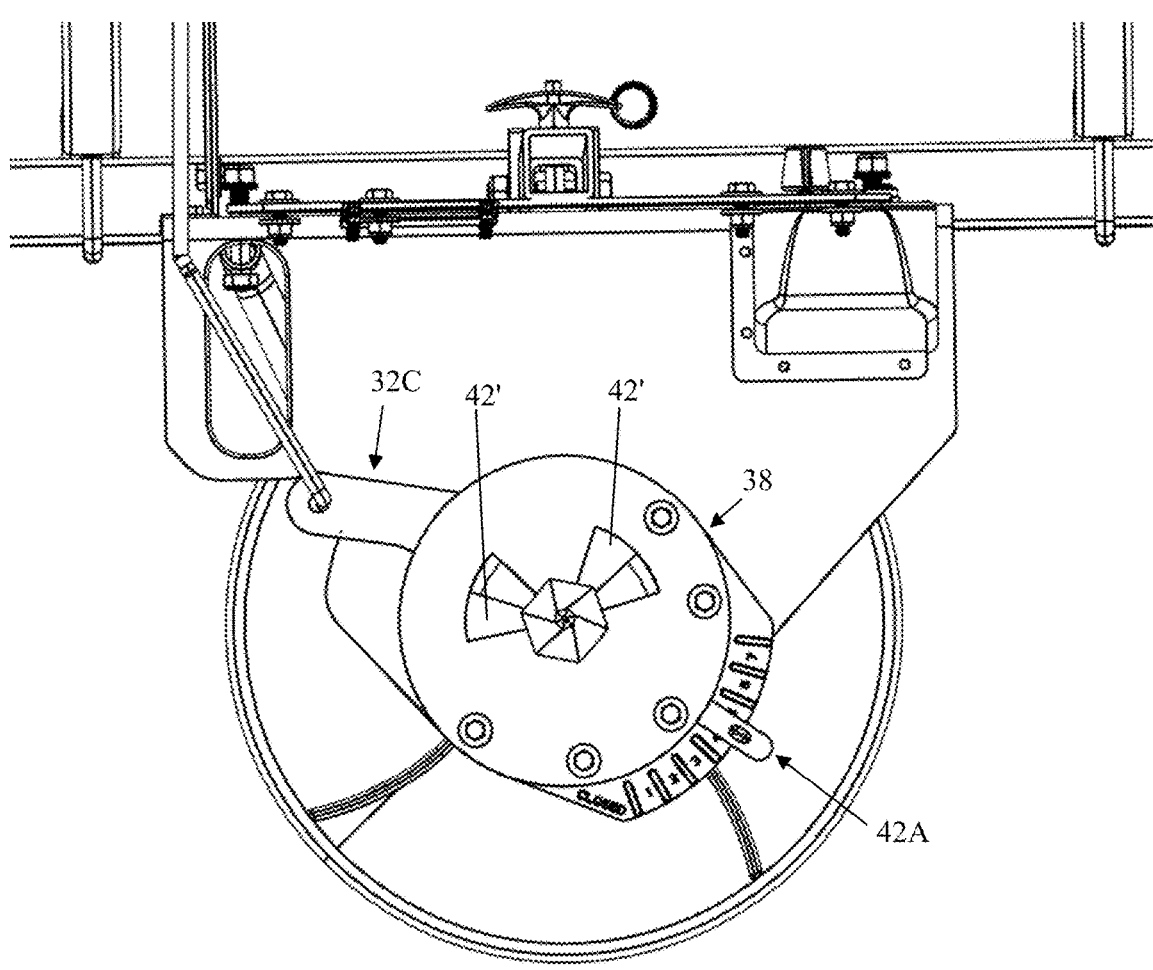
FIG. 11 is a top view of the flow adjustor in an intermediate open setting.
Figure 15:
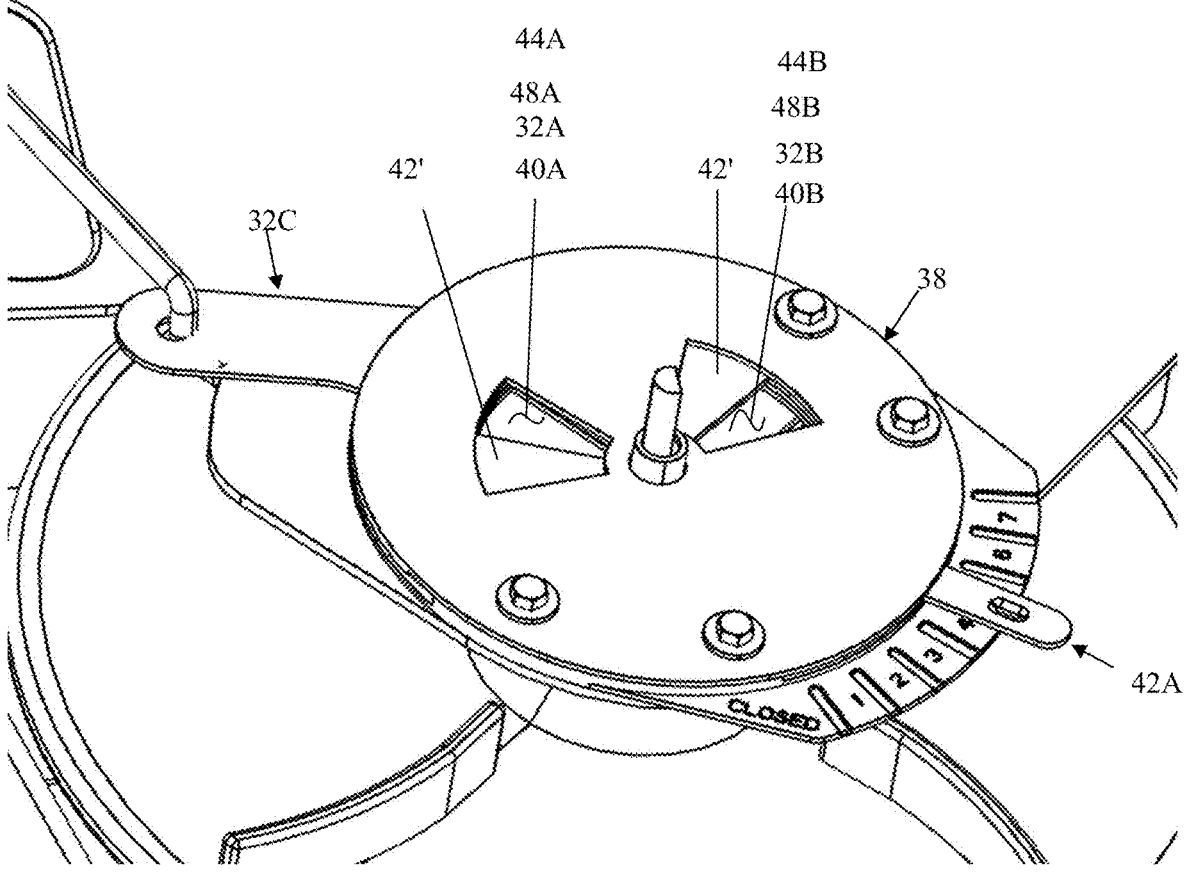
FIG. 15 is a top perspective of the flow rate assembly with the flow adjustor in an intermediate open position and the flow gate in the fully open position.

FIGS. 11 and 15, illustrate a fourth configuration (Configuration D) in which the flow adjustor 42 is in an intermediate open position and the flow gate is in the fully open position. The arrangement of the flow adjustor 42 at preset Position 4 causes the flow adjustor body 42' to partially obstruct the aligned openings of the upper housing portion 38, flow gate 32, and lower housing portion 40. The flow adjustor handle 42A is moved to preset Position 4 to arrange the flow adjustor 42 in an intermediate open position. The openings 48A, 48B of the flow adjustor 42 partially align with the openings 44A, 44B of the upper housing portion 38 to form a smaller opening overall. In the illustrated embodiment, the edge of the flow adjustor body 42' forms an arcuate opening having an angle of thirty degrees (referred to as Position 4 opening). The arm 32C of the flow gate 32 is moved to the rearward position such that the flow gate openings 32A, 32B align with the openings 40A, 40B of the lower housing portion 40. Thus the limiting flow factor is the Position 4 setting of the flow restrictor. The configuration of Configuration D is such that a medium amount of material is permitted to pass through the flow rate assembly.

It will be appreciated that the flow adjustor is moveable among the various preset positions 1-7 which will allow lesser or greater amounts of material to pass through the flow rate assembly. In the illustrated embodiment, preset positions 1, 2, 3, 4, 5, 6, 7, of the flow adjustor correspond with smaller to greater sized openings, respectively. The sizes of the wedge-shapes defined by the upper housing, flow adjustor, and flow gate could be manufactured to be larger or smaller sizes and/or different shaped.

Figure 17:
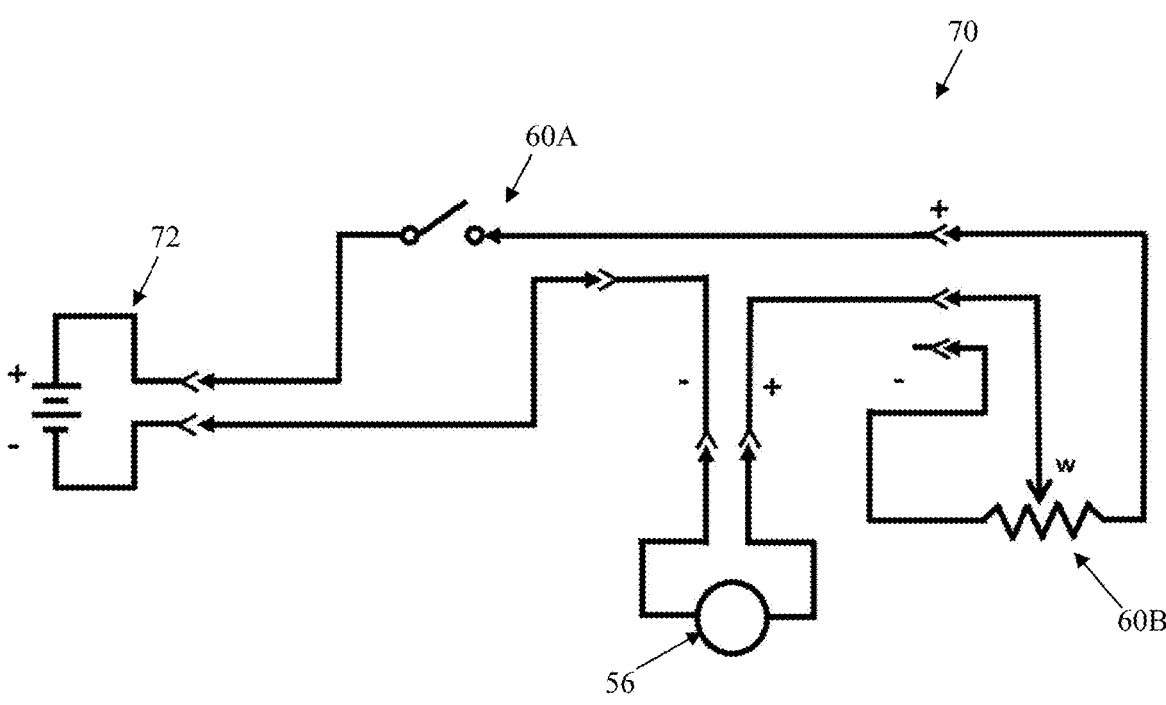
FIG. 17 is a schematic of a control system.

FIG. 17 illustrates a schematic of a control system 70 of the material spreader 10. The motor 56 is energized by a battery 72 (broadly, "power source") which can be the battery of the vehicle and operatively connected by appropriate circuitry (broadly "wiring"). The control system comprises a user interface having a user input. The user input comprises the first and second actuators 60A, 60B. The second actuator 60B further comprises a Rheostat (broadly, "resistor").

Figure 18:
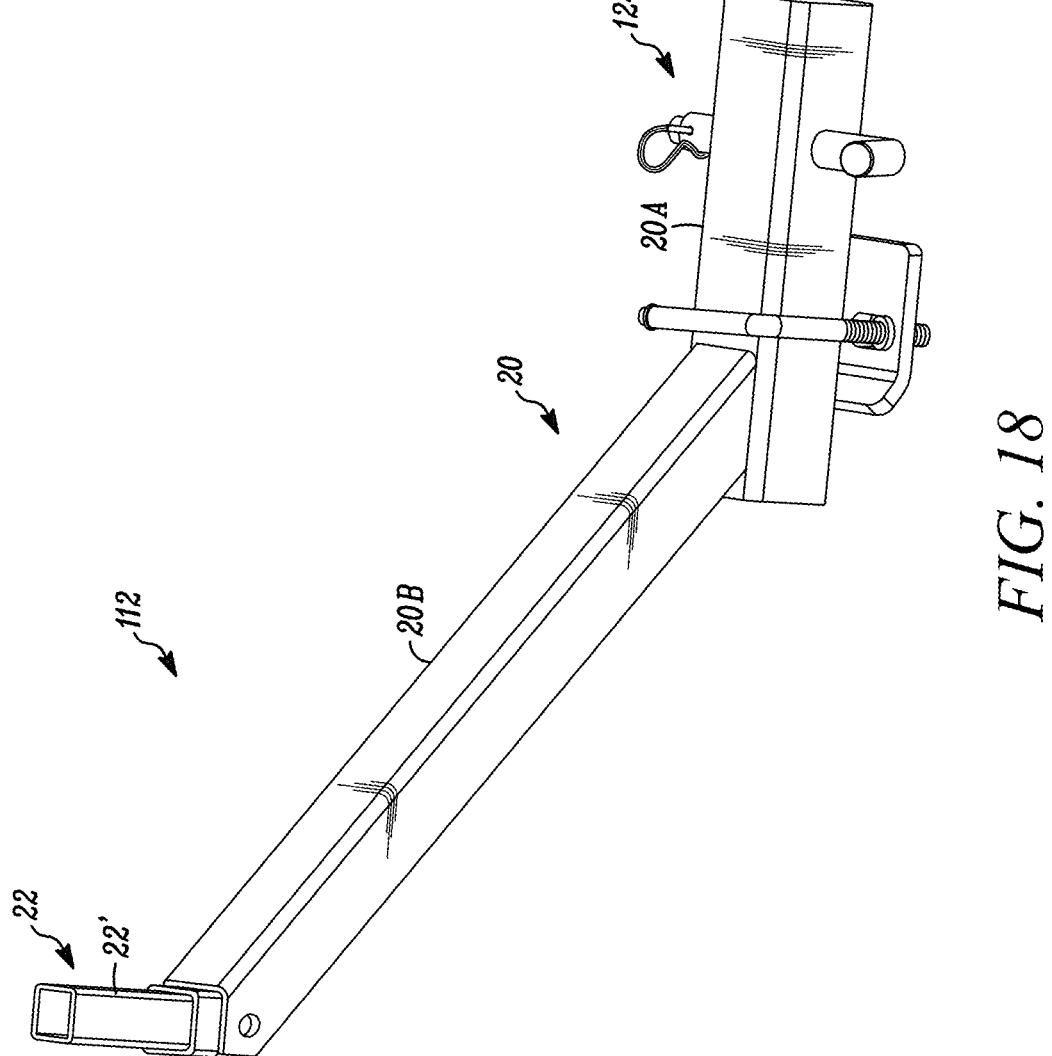
FIG. 18 is a perspective of a mount of a second embodiment.

Referring to FIG. 18, a mount 112 of the second embodiment is similar to the mount described above, and like reference numbers, plus 100, are used to designate like elements. The mount 112 comprises a frame 20 and a support receiver 22 (broadly, "connector"). The frame 20 includes first and second arms 20A, 20B. The first arm 20A (broadly, "hitch connector") is sized and shaped to be received on a hitch mount receiver of the vehicle. The first arm 20A defines a transverse opening arranged to align with an opening of the hitch mount receiver in which a fastener 124 (e.g. locking pin) can be received for locking the frame 20 to the hitch mount receiver. A proximal end of the second arm 20B extends from a distal end of the first arm 20A in an upward and rearward direction. In the illustrated embodiment, the second arm 20B is angled at about forty-five degrees with respect to the first arm 20A. The connector 22 is arranged at a distal end of the second arm. The connector 22 has a connector body 22' and is sized and shaped to connect to the spreader assembly. In the illustrated embodiment, the connector is a rectangular post arranged in a generally upstanding fashion with respect to the second arm configured to form a male/female connection with the connector 29 of the spreader assembly. The first and second arms can be integrally formed from stainless steel or other suitable materials. In the illustrated embodiment, the frame is configured to be receivable on a 1¼" hitch mount receiver.

Figure 19:
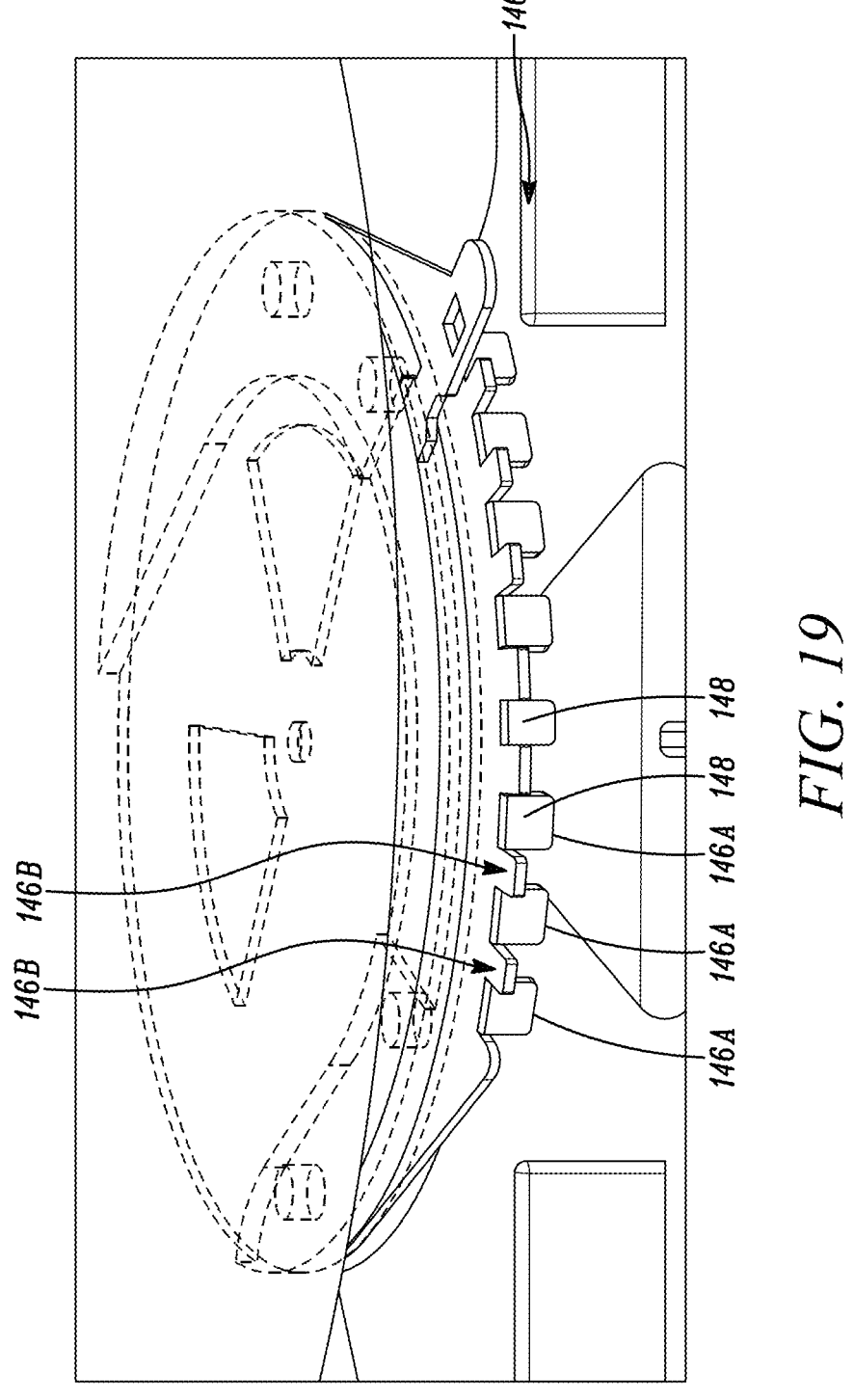
FIG. 19 is a second embodiment of a lock engagement structure.

Referring to FIG. 19, a lock engagement structure 146 of the second embodiment is similar to the lock engagement structure described above, and like reference numbers, plus 100, are used to designate like elements. The teeth 146A may define gaps 146B (broadly, "retainers") therebetween for receiving the keeper of the handle of the flow adjustor. Indicators are provided on flanges 148 of the teeth to represent a degree of openness of the flow restrictor corresponding to the setting. The gaps are configured to engage with the keeper of the handle of the flow adjustor in a secure fashion.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A material spreader usable with a user-operated All-Terrain Vehicle (ATV) or Utility-Terrain Vehicle (UTV) to spread material, the material spreader comprising:
   a mount configured to mount to the ATV or UTV;
   a spreader assembly comprising:
      a base;
      a hopper supported by the base and including an interior configured to hold a supply of the material, the hopper having an inlet through which material can be delivered to the interior and an outlet through which material can exit the interior;
      a thrower supported by the base and configured to spread the material from the hopper onto a surface over which the ATV or UTV moves;
   a control system including a power source and a motor operatively connected to the thrower;
   a flow rate assembly configured to control a flow rate at which the material flows to the thrower, the flow rate assembly including:
      gate passage structure configured to permit material to flow therethrough;
      a flow adjustor moveable with respect to the gate passage structure to change a degree of openness of the gate passage structure to adjust the flow rate at which the material flows to the thrower; and
      a gate moveable with respect to the gate passage structure and the flow adjustor, the gate being moveable between a closed position and an open position, the gate when in the closed position preventing flow of material from the hopper to the thrower, and the gate in the open position permitting flow of material from the hopper to the thrower through the gate passage structure.

2. The material spreader of claim 1, wherein the flow adjustor is configured to move with respect to the gate passage structure to different selectable preset positions corresponding to respective different degrees of openness of the gate passage structure permitted by the flow adjustor.

3. The material spreader of claim 2, wherein the flow rate assembly further comprises flow adjustor engagement structure configured to maintain the selected preset position of the flow adjustor.

4. The material spreader of claim 3, wherein the flow adjustor engagement structure comprises at least one retainer, and wherein the flow adjustor comprises a keeper configured to engage the at least one retainer to maintain the selected preset position of the flow adjustor.

5. The material spreader of claim 4, wherein the at least one retainer comprises a first retainer and a second retainer, the second retainer being different from the first retainer, the first and second retainers configured to correspond with respective first and second preset positions of the flow adjustor, the flow adjustor configured to permit a greater flow area through the gate passage structure when in the second preset position than when the flow adjustor is in the first preset position.

6. The material spreader of claim 5, wherein the flow rate assembly comprises a pivot axis, the flow adjustor is configured to pivot about the pivot axis to move the flow adjustor to the first or the second preset positions, and the gate is configured to rotate about the pivot axis to move between the open and closed positions.

7. The material spreader of claim 5, wherein the gate passage structure includes a first opening and a second opening, the first and second openings positioned to be in registration with each other to permit material from the hopper to flow through the first opening and then the second opening.

8. The material spreader of claim 7, wherein the gate passage structure includes an upper gate passage portion and a lower gate passage portion, and the flow adjustor and gate are located between the upper and lower gate passage portions.

9. The material spreader of claim 3, wherein the flow adjustor engagement structure is supported by the gate passage structure.

10. The material spreader of claim 1, wherein the gate passage structure comprises an upper gate passage portion, and the flow adjustor is arranged below the upper gate passage portion.

11. The material spreader of claim 3, wherein the flow adjustor engagement structure comprises a set of retainers, each retainer of the set being associated with a different preset position of the flow adjustor.

12. The material spreader of claim 11, further comprising a plurality of indicators, the plurality of indicators associated with respective retainers to indicate the degree of openness of the gate passage structure when the flow adjustor is in the preset positions corresponding to the respective retainers.

13. The material spreader of claim 1, wherein the flow adjustor comprises a handle engageable by a hand of a user to move the flow adjustor to change the degree of openness of the gate passage structure.

14. The material spreader of claim 1, wherein the gate comprises a handle configured to move the gate between the open and closed positions, the handle being configured to be reachable by a driver sitting in a driver seat of the ATV or UTV when the material spreader is mounted on the ATV or UTV.

15. A material spreader usable with a user operated All-Terrain Vehicle (ATV) for spreading material, the material spreader comprising:

a mount configured to mount to the ATV;

a spreader assembly comprising:

a base;

a hopper supported by the base and configured to hold a supply of the material;

a thrower supported by the base and configured to spread the material from the hopper to a surface over which the ATV moves;

a flow rate assembly configured to control a flow rate at which the material flows to the thrower;

a control system including a power source and a motor operatively connected to the thrower; and a user interface operatively connected to the control system, the user interface includes at least one actuator configured to permit the user to adjust a speed setting of the motor and turn the motor on and off, the at least one actuator including a first actuator configured to turn the motor on and off, wherein the first actuator is disposed at an elevation above the thrower and is arranged to be reachable by a driver sitting in a driver seat of the ATV when the material spreader is mounted on the ATV.

16. The material spreader of claim 15, wherein the at least one actuator comprises a second actuator including a variable resistor configured to increase or decrease electrical current supplied to the motor.

17. The material spreader of claim 16, wherein the variable resistor is a Rheostat.

18. The material spreader of claim 15, wherein the at least one actuator is supported by the base.

19. The material spreader of claim 15, further comprising an actuator housing supported by the base, the actuator housing supporting the at least one actuator and housing electronics of the control system.

20. The material spreader of claim 19, wherein the actuator housing comprises a waterproof seal configured to prevent moisture from entering the actuator housing.

21. The material spreader of claim 19, further comprising a waterproof sealant at an interface between the at least one actuator and the actuator housing to prevent moisture from entering the actuator housing through the interface between the at least one actuator and the actuator housing.

22. The material spreader of claim 15, wherein the at least one actuator comprises a second actuator configured to permit the user to adjust the speed setting of the motor.

23. The material spreader of claim 22, wherein the first and second actuators are of different types.

24. The material spreader of claim 15, wherein the flow rate assembly comprises a gate that includes a handle configured to move the gate between a closed position and an open position, the handle being configured to be reachable by a driver sitting in a driver seat of the ATV when the material spreader is mounted on the ATV, wherein the handle is disposed on one side of the hopper and the first actuator is disposed on the opposite side of the hopper.

25. The material spreader of claim 1, wherein flow adjustor is moveable independent of and relative to the gate to change the degree of openness of the gate passage structure to adjust the flow rate at which the material flows to the thrower.

26. The material spreader of claim 1, wherein the flow rate assembly comprises a pivot axis, the flow adjustor is configured to pivot about the pivot axis to change the degree of openness of the gate passage structure, and the gate is configured to rotate about the pivot axis to move between the open and closed positions.

27. The material spreader of claim 1, wherein the gate passage structure includes a first opening and a second opening, the first and second openings positioned to be in registration with each other to permit material from the hopper to flow through the first opening and then the second opening.

28. The material spreader of claim 27, wherein the gate passage structure includes an upper gate passage portion and a lower gate passage portion, the upper gate passage portion forming the first opening and the lower gate passage portion forming the second opening, the flow adjustor and gate being located between the upper and lower gate passage portions.

29. The material spreader of claim 1, wherein the gate is configured to rotate about a pivot axis to move between the open and closed positions.

30. The material spreader of claim 13, wherein the handle of the flow adjustor is arranged to be out of reach of a driver sitting in a driver seat of the ATV or UTV when the material spreader is mounted on the ATV or UTV.

31. The material spreader of claim 13, wherein the hopper is positioned between the handle of the flow adjustor and a driver seat of the ATV or UTV when the material spreader is mounted on the ATV or UTV.

32. The material spreader of claim 1, wherein the flow rate assembly comprises a set of retainers, and the flow adjustor comprises a handle with a keeper configured to engage one retainer in the set of retainers at a time to maintain a selected preset position of the flow adjustor, wherein the handle and the set of retainers project in a direction away from a driver seat of the ATV or UTV when the material spreader is mounted on the ATV or UTV.

33. The material spreader of claim 15, wherein the at least one actuator is configured to permit the user to turn the motor on and off without changing the speed setting of the motor.

34. The material spreader of claim 15, wherein the base includes a bracket having a horizontal panel, wherein the first actuator is disposed above the horizontal panel of the bracket and the thrower is disposed below the horizontal panel.

35. The material spreader of claim 34, wherein the first actuator is supported by an actuator housing, the actuator housing secured to an upper surface of the horizontal panel.

\* \* \* \* \*